United States Patent [19]

Taylor et al.

[11] 4,054,432
[45] Oct. 18, 1977

[54] POLYMER LINED CAPILLARY COLUMN AND METHOD FOR PRODUCING SAME

[75] Inventors: Paul J. Taylor, Fairborn; Frank W. Harris, Xenia, both of Ohio

[73] Assignee: Wright State University, Dayton, Ohio

[21] Appl. No.: 695,018

[22] Filed: June 11, 1976

[51] Int. Cl.² .......................................... B01D 15/08
[52] U.S. Cl. ..................................... 55/386; 427/230
[58] Field of Search ..................... 55/67, 197, 386; 210/31 C, 198 C; 427/230; 428/35, 36

[56] References Cited

U.S. PATENT DOCUMENTS

| | | | |
|---|---|---|---|
| 3,267,151 | 8/1966 | Pillehich | 55/67 X |
| 3,547,684 | 12/1970 | Hollis et al. | 427/230 |
| 3,663,263 | 5/1972 | Bodne et al. | 55/386 X |
| 3,822,530 | 7/1974 | Fuller et al. | 55/67 |

*Primary Examiner*—John Adee
*Attorney, Agent, or Firm*—Biebel, French & Nauman

[57] ABSTRACT

A polymer lined capillary column for use in gas chromotagraphy has a thin layer of ethoxycarbonyl substituted polyphenylene resin solvent deposited and uniformly coated on the interior surface of the base column as a support for a stationary phase, the resin coated column further including a separate stationary phase with the resin.

4 Claims, No Drawings

POLYMER LINED CAPILLARY COLUMN AND METHOD FOR PRODUCING SAME

BACKGROUND OF THE INVENTION

This invention relates to open tubular capillary columns for gas chromatography and more particularly, to stable columns lined with a polymeric material which serves as a support for the stationary phase.

The development of open tubular glass capillary columns for gas chromatography has made possible high resolution separations in a wide variety of applications. These columns can be made to almost any desired length. Therefore, a maximum number of theoretical plates may be obtained, and the resolution of any separation is enchanced. Other advantages are that only a small sample size is required and that there is a low pressure drop. Glass is an inexpensive material and is relatively inert, making it ideal for chromatographic columns. The HETP, the height equivalent to the theoretical plate, is an expression of column efficiency. It is related to the average linear gas velocity, $\mu$, in the van Deemter equation.

$$HETP = A + B/\mu + C\mu$$

The various factors contributing to a large HETP and thus to a less efficient column are represented by A, B, and C. The term representing the effect of multiplicity of gas paths is designated as A, the term representing longitudinal diffusion as B, and the term representing mass transfer as C. Since the column is an open tube, there is only one path for the carrier gas which eliminates any diffusion due to the multiplicity of gas paths as in a packed column and therefore increases the efficiency of the column since the A term is equal to zero.

Disadvantages experienced in using glass open tubular columns are that the columns are fragile and that only a very small sample can be injected, which necessitates the use of a splitter. Of course, metal columns or metal supported glass columns are a known means of reducing the breakage problem.

This, however, does not solve the major disadvantage of open tubular columns — their instability. This is thought to be a result of the stationary phase eventually changing from an initial thin uniform layer to individual droplets of different thicknesses and allowing the glass itself to be exposed to the solutes injected on the column. Both the exposed polar sites on the glass surface and the variable thickness of the stationary phase degrade the column performance and efficiency.

Much work has been done in the area of stabilization. One general method which has been used is the etching of the surface of the glass with hydrogen chloride gas resulting in an increase of the critical surface tension of the glass and thereby permitting the stationary phase to more easily wet the glass. See, e.g., Alexander et al, *Chromatographia*, Vol. 6, pp. 231+ (1973). Although this allows for the preparation of more efficient columns, it does not necessairly add to their stability. It was necessary to use soft glass for these columns since borosilicate glass does not lend itself well to etching as reported in Hishta et al., *Advanc. Chromatogr.*, Vol. 9, pp. 215+ (1970).

Another approach, as mentioned in Jennings et al., *J. Chromatogr. Sci.*, Vol. 12, pp. 344+ (1974) is preparation of the glass surface by rinsing with a variety of solvents in order to provide a clean surface. This has resulted in columns with useful lives of several months as well as an increased number of theoretical plates over columns which were not thoroughly cleaned. The use of chromic-sulfuric acid cleaning solution also aids in the production of a more uniform film of stationary phase by increasing the surface tension of the glass as disclosed in Necasova et al., *J. Chromatogr.*, Vol. 79, pp. 15+ (1973). The addition of an inert solid support to the surface of the glass such as Silanox 101, a hydrophobic fumed silica dioxide, results in the formation of a thin film of stationary phase which does not break up into droplets after repeated heating and cooling. This possibility is discussed in German et al., *Anal. Chem.*, Vol. 45, pp. 930+ (1973). Columns have also been prepared by using a colloidal suspension of graphite resulting in more efficient columns, but no report was made as to their stability. See, e.g., Nota et al., *J. Chromatogr.*, Vol. 95, pp. 229+ (1974). Similarly, sodium chloride crystals have been used as a solid support with good results as set forth in Watanabe et al., *J. Chromatogr. Sci.*, Vol. 13, pp. 123+ (1975), but there is no report of stability.

All of these methods are an attempt to change the surface of the glass to make it more compatible with the stationary phase. As reported in Horvath et al., *Amer. Lab.*, August 1974 at page 75, some of these methods have met with limited success, especially with non-polar stationary phases. Polar stationary phases, however, have an even greater tendency to form microdroplets on the surface of the glass instead of remaining as a uniform film, reducing the efficiency of the column. The need, therefore, exists for the construction of stable capillary columns which can be used with polar stationary phases.

SUMMARY OF THE INVENTION

The present invention meets that need by providing a column stabilized with a thin polymeric lining on which the stationary phase is placed. The polymeric material is uniformly coated on the interior surface of the base column, which may be glass, metal or metal supported glass. The stationary phase is either present in the polymeric lining (i.e., intermixed therewith during the initial coating) or is subsequently coated onto a polymer lined column to form a second layer overlying the polymer layer.

Preferred as the polymeric coating material is one such as ethoxycarbonyl substituted polyphenylene resin. Such a polymer has good thermal stability, is soluble in an organic solvent (so as to be coatable from a solvent base), and does not degrade at elevated temperatures. In addition, it can be easily cast into thin films and has the ability to wet glass. Also, the films which are formed are tough and resistant to mechanical deformation. Other polymers having similar characteristics, may also be used. Various polyamide and polyimide resins, as well as certain high temperature polyesters, may be used in place of the preferred resin.

Any of the known stationary phases may be used with the polymer lined column. Tests were made using UCON LB 550X, from Chemical Research Services, Inc. of Addison, Ill. This is a polyoxyphenylene derivative of butanol containing an antioxidant. It was chosen because it is one of the more polar stationary phases. The more polar the stationary phase, the more difficult it is to produce a stable column. Thus, by showing that a polymer lined column such as that disclosed herein is capable of producing a stable column with the UCON LB 550X stationary phase, there is demonstrated usefulness with any of the less polar stationary phases.

The system of classification outlined by Rohrschneider (see, Rohrschneider, *Advan. Chromatogr.*, Vol. 4, pp. 333+ (1967)) can be used for the identification of stationary phases and to check for other stationary phases which could be used in place of less stable stationary phases. Tables are available which list the Rohrschneider constants in increasing order for available stationary phases. For example, W. R. Supina, in *The Packed Column in Gas Chromatography* (1974), from Supelco, Inc. of Bellefonte, Pa. at page 65 presents such a table. By understanding the interactions between the solutes and the stationary phase it is possible to predict which stationary phase would be best for a given separation. For example, the separation of a mixture of hydrocarbons could best be accomplished on a relatively nonpolar column, one with a low value for the Rohrschneider constant for the benzene probe, since the resulting peaks would be symmetrical and little tailing would be observed.

In this way, it is possible to select an appropriate stationary phase for the desired separation. Since the column is lined with a polymeric material as described, then, the stationary phase is in contact with that polymeric lining rather than the surface of the base column. This results in a smooth stationary phase layer rather than a beaded one as is present on a normal glass column surface. This means that the coated column of the present invention has an efficiency essentially as good as an ordinary glass one while at the same time having vastly superior stability.

Stability, i.e., the ability of the column to perform efficiently after long periods of use, is most important to commercial operations. A lined column, even though more expensive than an ordinary glass one, is still highly desired if it has the ability to perform as efficiently in gas chromatography separations for a period longer than the ordinary glass column.

Accordingly, it is an object of the present invention to provide a stabilized, polymer lined, capillary column for use in gas chromatography.

Another object of the present invention is to provide a method for producing such polymer-lined capillary columns.

Other objects and advantages of the present invention will be apparent from the following description and the appended claims.

DESCRIPTION OF THE PREFERRED EMBODIMENTS

The preferred polymer for lining the column is an ethoxycarbonyl substituted polyphenylene resin. The structure is

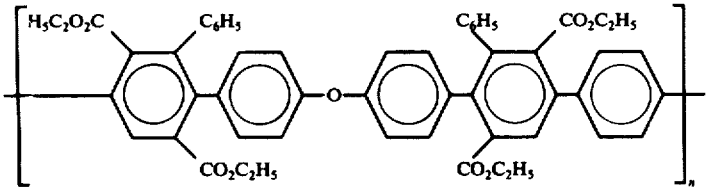

This polymer possesses several characteristics which make it well suited for the stabilization of capillary columns. First, the polymer can be easily cast into thin films and has the ability to wet glass. The films which are formed are tough and resistant to mechanical deformation. The polar substituents allow for solubility in chlorinated hydrocarbon solvents. The glass transition temperature is 198° C and no decomposition occurs until temperatures over 300° C. All of these factors contribute to the ready formation of a thin, stable film on the inside surface of a glass capillary column. The methods for synthesizing this material as well as a further description of its characteristics is given in Harris et al, *Polymer Preprints*, Vol. 15, pp. 691+ (1975).

The stationary phase, UCON LB 550X, which was used as the test material is a polyoxyphenylene derivative of butanol with the addition of an antioxidant. A description of this particular stationary phase was given on page 2 of the presentation made by Mueller et al. at the 29th Annual Meeting of the American Society of Lubricating Engineers in Cleveland, Ohio, April 1974. Preferably, the stationary phase is coated in a separate step as a second layer over the polymer layer of the lined column. However, even when the polymer and stationary phase are mixed and applied to the column as a single solution the polymer still possesses the ability to stabilize the column.

Low concentrations of polymer (preferably less than 2% solutions) can be used to make thin films that will not affect the values of the Rohrschneider constants, but will stabilize the columns. Thus, stationary phases that previously had to be abandoned due to their instability, can now be used in open tubular chromatography. High concentrations of polymer could be used, however, to produce more polar columns with the desired Rohrschneider constants from less polar phases where problems in thermal stability or solubility of the stationary phase exist.

Normally, the concentration of a stationary phase has no effect on the Rohrschneider constants. It was noted, however, that for the columns coated with the same concentration of polymer, a decrease in concentration of the stationary phase will cause the Rohrschneider constants to increase. If a high concentration (greater than an approximately 4% solution) of stationary phase is used the influence of the polymer on the separation is minimized and thus it has no effect on the Rohrschneider constants. A low concentration of the stationary phase has the opposite effect. The Rohrschneider constants steadily increase the polymer has more influence with decreasing concentration of stationary phase and increasing concentration of polymer.

There are two possible interpretations of this behavior. One is that the polymer forms a layer on the glass upon which is deposited a layer of the UCON LB 550X which remains as a separate and discrete phase. The other is that the polymer and UCON LB 550X mix and form a solution. The latter interpretation is believed to be correct. It should be pointed out that either interpretation would explain why the columns are more stable. In the former case the liquid phase is isolated from the glass and in contact with a more compatible material while in the latter case the polymer acts as a matrix which prevents the UCON LB 550X from forming droplets.

The evidence to support the theory that the polymer and stationary phase form a solution rather than remaining as two discrete phases is established by the experimental data as illustrated in the following examples. The results of these experiments also establish the fact that the useful life of a glass open tubular column can be prolonged by the use of a polymeric lining as a support for the stationary phase (i.e., the column has been stabilized), and that the efficiencies are essentially the same as unlined capillary columns.

EXAMPLES

The capillary columns used in the examples were drawn from 1.5 meter, 2.3 mm I.D., 4.8 mm O.D. borosilicate glass tubes using the Hupe-Busch glass drawing apparatus available from Hewlett-Packard. The tubes were rinsed before drawing once with Chromerge, chromic-sulfuric acid cleaning solution, and then with ten rinses of distilled water. This was followed by ten alternate rinses each of acetone, methanol, and methylene chloride. The final capillary columns were generally 30 meters in length, 1.0 mm O.D., and 0.6 mm I.D. in coils having a 12 cm diameter.

The gas chromatograph was a Hewlett-Packard Model 5700A adapted for use with capillary columns by the addition of a variable splitter and a low dead volume insert in the detector. The flame ionization detector and the injector were both operated at a temperature of 150° C and the column at 100° C. The sample size injected was generally 1 $\mu$l and the splitter was operated at a 30 to 1 ratio. The carrier gas was prepurified nitrogen flowing through the column at 2 ml/min unless otherwise noted. Molecular sieves were used to further purify the carrier gas and the hydrogen used for the detector.

The method used to coat the open tubular columns was a dynamic two-step process in which the resin solution was forced as a plug through the base column and left as a film on the interior surface. The thickness of the film deposited on the base column could be controlled by either varying the plug velocity or the concentration of the resin solution. The latter method was used in the examples. A 60 cm length of 0.4 cm I.D. stainless steel tubing was used as a reservoir for the coating solution as described by Nikelly in *Anal. Chem.*, Vol. 44, pp. 623+ (1972). The base column was attached to the bottom of the reservoir and hung in a vertical fashion. Nitrogen flow was adjusted by a flow controller installed between the tank regulator and the coating reservoir to give a flow rate of approximately 5 cm/sec through the capillary column. The entire system was rinsed twice with 10 ml portions of methylene chloride. This was followed by silanization of the column by passing a solution of 250 $\mu$l of SILYL-8 dissolved in 2.5 ml of methylene chloride followed by immediate rinsing with a 10 ml portion of methylene chloride. The silanized column was allowed to drain and partially dry for about thirty minutes. The coating solution was prepared by adding a weighed amount of polymer to a 5.00-ml volumetric flask and diluting to the mark with methylene chloride. All percentages were calculated as weight per volume of solution. The entire 5 ml of solution was added to the reservoir and immediately forced through the column. The average linear flow rate was determined by measuring the time required for the solution front to reach the end of the column and dividing that time into the length of the column. The solution was collected as it exited from the column and the approximate volume was measured with a graduated cylinder. The column was allowed to dry overnight with the nitrogen flowing at a rate of 1 ml/min.

The second step was to coat the surface of the polymer lined column with the desired stationary phase. First, the polymer surface was wetted by passing a 10 ml portion of methanol through the column. The solution of stationary phase was prepared and coated in the same manner as the polymer solution. Again, the column was allowed to dry overnight with the nitrogen flowing through it. Most of the columns were prepared in this two-step process. However, one column was prepared by combining the polymer and the stationary phase in methanol and coating the column in one step. For comparisons another column was prepared using Silanox 101 according to the procedure outlined by A. L. German, et al. in *Anal. Chem.*, Vol. 45, pp. 93+ (1973).

Table I, below, lists the estimated loadings of polymer and of stationary phase for each column used in the subsequent runs. The loading was calculated from the volume and concentration of solution which remained on the column. The solvent was then evaporated to deposit the polymer or stationary phase.

TABLE I

| | ESTIMATES OF STATIONARY PHASE LOADINGS AND POLYMER LOADINGS | | | |
|---|---|---|---|---|
| Column | %UCON LB 550X | Loading (g/m) UCON LB 550X | % Polymer | Loading (g/m) Polymer |
| 1 | 4.0 | $1 \times 10^{-4}$ | 0 | 0 |
| 2 | 4.0 | $2 \times 10^{-4}$ | 0 | 0 |
| 3 | 4.0 | $2 \times 10^{-4}$ | 0 | 0 |
| 4 | 4.0 | $2 \times 10^{\times 4}$ | 0.2 | $4 \times 10^{-5}$ |
| 5 | 4.0 | $1 \times 10^{-4}$ | 2.0 | $4 \times 10^{-4}$ |
| 6 | 4.0 | $3 \times 10^{-4}$ | 2.0 | $6 \times 10^{-4}$ |
| 7 | 4.0 | $3 \times 10^{-4}$ | 6.0 | $2 \times 10^{-3}$ |
| 8 | 4.0 | $5 \times 10^{-4}$ | 10.0 | $6 \times 10^{-3}$ |
| 9 | 1.0 | $1 \times 10^{-4}$ | 2.0 | $5 \times 10^{-4}$ |
| 10 | 2.0 | $1 \times 10^{-4}$ | 2.0 | $6 \times 10^{-4}$ |
| 11 | 2.0 | $2 \times 10^{-4}$ | 2.0 | $6 \times 10^{-4}$ |
| 12 | 2.0 | $5 \times 10^{-4}$ | 2.0 | $5 \times 10^{-4}$ |
| 13 | 10.0 | $1 \times 10^{-3}$ | 2.0 | $5 \times 10^{-4}$ |

Columns No. 1 and No. 2 are uncoated glass columns of the same material as the base columns used to prepare the polymer lined columns. Column No. 3 is the one prepared using Silanox 101, and Column No. 12 is the one prepared by intermixing the resin solution and stationary phase prior to coating.

The test capillary columns were connected to the gas chromatograph for the conditioning step and the carrier gas flow rate was adjusted to about 2 ml/min. The temperature program was held at 50° C for 1 hour, raised 2° C/min to 150° C and held for 5 hours, and finally raised 2° C/min to 180° C and held for 2 hours.

The Rohrschneider constants were determined by injecting 1 $\mu$l samples, split 30:1, at a flow rate of 2 ml/min. Column temperature was maintained by 100° C. Triplicate injections of methane (used as the nonretained peak), the n-alkane series of pentane through undecane, and the five probes necessary for the five Rohrschneider constants were made.

The results are given in Tables II–III below.

TABLE II

COMPARISON OF COLUMNS COATED WITH A SOLUTION OF 4.0% UNCON LB 550X

| Column | % Polymer | Rohrschneider Constant* | | | | |
|---|---|---|---|---|---|---|
| | | X | Y | Z | U | S |
| 1 | 0 | 1.11 | 2.76 | 1.69 | 3.13 | 1.95 |
| 2 | 0 | 1.11 | 2.74 | 1.56 | 3.21 | 2.13 |
| 3 | 0ᵃ | 1.10 | 2.76 | 1.66 | 3.16 | 2.05 |
| 4 | 0.2 | 1.09 | 2.76 | 1.69 | 3.15 | 2.02 |
| 5 | 2.0 | 1.24 | 2.79 | 1.88 | 3.65 | 2.53 |
| 6 | 2.0 | 1.39 | 2.96 | 1.94 | 3.63 | 2.50 |
| 7 | 6.0 | 2.26 | 3.76 | 2.92 | 4.93 | 3.68 |
| 8 | 10.0 | 3.63 | 5.24 | 4.44 | 6.51 | 5.45 |
| Literature Value | | 1.14 | 2.76 | 1.68 | 3.12 | 2.08 |

ᵃCoated with a solution of 1% Silanox 101 before coating with UCON LB 550X
*The probes used were: x = benzene; y = ethanol, z = 2-butanol, u = nitromethane, and s = pyridine.

TABLE III

Comparison Of Columns Coated With A Solution Of 2.0% Polymer

| Column | % UCON LB 550X | Rohrschneider Constant* | | | | |
|---|---|---|---|---|---|---|
| | | X | Y | Z | U | S |
| 9 | 1.0 | 1.93 | 3.69 | 2.61 | 5.25 | 3.30 |
| 10 | 2.0 | 1.51 | 3.26 | 2.14 | 4.03 | 2.65 |
| 11 | 2.0 | 1.51 | 3.16 | 2.11 | 4.08 | 2.83 |
| 12 | 2.0ᵃ | 1.51 | 3.16 | 2.04 | 4.08 | 2.77 |
| 5 | 4.0 | 1.24 | 2.79 | 1.88 | 3.65 | 2.53 |
| 6 | 4.0 | 1.39 | 2.96 | 1.94 | 3.63 | 2.50 |
| 13 | 10.0 | 1.29 | 2.92 | 1.87 | 3.40 | 2.25 |
| Literature Value | | 1.14 | 2.76 | 1.68 | 3.12 | 2.08 |

ᵃCoated in one step
*The probes used were: x = benzene, y = ethanol, z = 2-buanol, u = nitromethane, and s = pyridine.

Table II lists the Rohrschneider constants for the columns made from identical solutions of stationary phase (4.0% UCON LB 550X), but increasing concentrations of polymer. The columns which were prepared by coating the stationary phase directly onto the glass, with no pretreatment except washing, and the column prepared with Silanox 101 showed good agreement with the literature values of the Rohrschneider constants. The Rohrschneider constants should be independent of concentration of the stationary phase and the rate of coating since they are constant for that particular stationary phase. The Rohrschneider constants increased, however, as the concentration of polymer increased. A small amount of polymer used as a thin film support for the stationary phase had a minimal effect on the Rohrschneider constants, but as the polymer concentration increased beyond 3 to 4%, a drastic increase in the Rohrschneider constants were observed. In general, the same behavior was observed for each of the solutes resulting in nearly parallel curves. The sole exception was ethanol which exhibited no increase in the Rohrschneider constant value until the polymer concentration was greater than 2%. This anomalous behavior is possibly a result of the ability of ethanol to hydrogen bond to the stationary phase.

Thus, from the results in Table II it is shown that the preferred polymer concentration is found in the tests using less than 2% resin solution (Column 6). As seen in Table I this equates to a loading of 6 × 10⁻⁴ g/m. As mentioned previously, such thin coatings are also obtainable using more concentrated resin solutions but a faster pass-through during the coating step.

Table II lists the Rohrschneider constants for columns made from identical solutions of 2.0% polymer but increasing concentrations of stationary phase. The Rohrschneider constants at first decreased as the concentration of stationary phase increased. Each Rohrschneider probe showed nearly identical trends resulting in almost parallel curves. As the concentration of the stationary phase increases the polymer has less effect on the Rohrschneider constants, which asymptotically approach the literature values. When the concentration of the liquid phase is 4% or greater, the Rohrschneider constants are the same as the values that would be obtained when no polymer is present. It is interesting to note that a column prepared by coating with a solution of polymer and stationary phase in one step has the same Rohrschneider constants as one in which the concentrations are the same but coated in two steps.

From this it can be seen that best results are obtained from columns lined using a 2% or less concentrated resin solution in conjunction with a 4% or more concentration of stationary phase solution.

To illustrate the method of calculations of the Rohrschneider constants, Table IV shows representative data and calculations for Column 13.

TABLE IV

Determination Of Rohrschneider Constants for Column 13

| | Probe | | | | |
|---|---|---|---|---|---|
| | X | Y | Z | U | S |
| Retention Time (min) | 9.46 | 8.16 | 8.58 | 9.83 | 13.92 |
| Adjusted Retention Timeᵃ (min) | 2.46 | 1.16 | 1.58 | 2.83 | 6.92 |
| Retention Index (I) | 778 | 676 | 718 | 797 | 920 |
| Retention Index on Squalene (I) | 649 | 384 | 531 | 457 | 695 |
| ΔI | 129 | 292 | 187 | 340 | 225 |
| Rohrschneider Constant | 1.29 | 2.92 | 1.87 | 3.40 | 2.25 |

ᵃRetention time of methane (non-retained peak) is 7.00 min.
*(as in II and III)

The change in efficiency of a column over a period of time can best be established by noting any change in HETP. The HETP studies were performed at a temperature of 100° C and at various flow rates of carrier gas. A variety of compounds were used for the determinations including 1-propanol, n-decane, and n-octane. A repeat study after several months was done at the same temperature and flow rate to measure any change in column efficiency or performance. The conventional formula for the determination of HETP was used for all calculations of column efficiency. In these examples, that formula was:

$$\text{HETP} = \frac{L}{16}\left(\frac{W}{t_R}\right)^2$$

where
L = the length of the column
$t_R$ = the retention time
W = the peak width at the baseline.

Table V shows the change in HETP values for the columns after several months. The final HETP values were obtained by injecting the sample at the same temperature and flow rate as the initial determination. Slight experimental variations in flow rate should not be confused with actual loss or gain in efficiency. Also no direct comparison can be made between the various columns listed in Table V as to their maximum efficiency.

TABLE V

STABILITY MEASUREMENTS USING 1-PROPANOL FOR HETP DETERMINATIONS

| Column | % UCON LB 550X | % Polymer | Initial HETP (cm) | Final HETP (cm) | Ratio[a] | Time Lapse (months) |
|---|---|---|---|---|---|---|
| 2 | 4.0 | 0 | 0.12 | 0.20 | 2 | 2 |
|   |     |   | 0.12 | 0.33 | 3 | 3 |
| 3 | 4.0 | 0[b] | 2.5 | 2.5 | 1 | 3 |
| 4 | 4.0 | 0.2 | 0.15 | 0.15 | 1 | 2 |
| 6 | 4.0 | 2.0 | 0.73 | 1.0 | 1 | 2 |
| 7 | 4.0 | 6.0 | 6.1 | 6.3 | 1 | 1 |
| 8 | 4.0 | 10.0 | 97 | 92 | 1 | 2 |
| 9 | 1.0 | 2.0 | 0.37 | 0.38 | 1 | 2 |
| 11 | 2.0 | 2.0 | 1.4 | 1.1 | 1 | 2 |
|    |     |     | 1.4 | 1.4 | 1 | 4 |
| 12 | 2.0 | 2.0[c] | 1.6 | 1.6 | 1 | 2 |
| 13 | 10.0 | 2.0 | 1.2 | 0.9 | 1 | 2 |

[a]Ratio = final HETP / initial HETP
[b]Coated with a solution of 1.0% Silanox 101 before coating with UCON LB 550X
[c]Coated in one step The efficiency of the columns where the stationary phase was coated directly on to the glass decreased steadily with time. A noticeable decrease in efficiency of Column 2 was evident after only two months. The stationary phase was visible on the interior surface of the glass as small beads after the column is heated and cooled. The addition of Silanox 101 increases the surface area and provides a more stable surface for the stationary phase. The Silanox 101 column (Column 3) did not appear to have any loss of efficiency over a period of 3 months. This is in agreement with earlier studies.

Significantly, no loss of efficiency was noticed for any of the columns (Columns 4–13) which were coated with the polymer. The polymer provides a thermally stable film upon which the stationary phase may be coated or in which it may be dissolved and thereby stabilized. No change was noticed in the polymer film after heating. Heating under the microscope revealed that the polymer did not begin to lose its rigidity until above 200° C. The glass transition temperature of the polymer has been reported as 198° C.

Some columns were studied at random using n-decane and n-octane to determine the HETP and the results were the same, see Table VI below.

TABLE VI

STABILITY MEASUREMENTS USING n-OCTANE FOR HETP DETERMINATIONS

| Column | % UCON LB 550X | % Polymer | Initial HETP (cm) | Final HETP (cm) | Ratio[a] | Time Lapse (months) |
|---|---|---|---|---|---|---|
| 1 | 4.0 | 0.0 | 0.6 | 2.8 | 5 | 5 |
| 10 | 2.0 | 2.0 | 0.29 | 0.29 | 1 | 4 |

[a]Ratio = final HETP / initial HETP

The addition of a polymer film as a support for the stationary phase appears to stabilize the glass columns. Sample chromatograms of n-octane on Column 10, coated with solutions of 2.0% UCON LB 550X and 2.0% polymer, initially and after several months were observed. By comparison, sample chromatograms, before and after several months, of n-octane on Column 1, coated only with a solution of 4.0% UCON LB 550X with no polymer support were observed. The performance of Column 10 is the same after 4 months while the performance of Column 1 is markedly poorer. Increasing the HETP from 0.6 to 2.8 cm has the same effect on a separation as taking the original 36 meter column and cutting the length to eight meters. Thus, one of the inherent advantages of open tubular columns (long length and consequent large number of plates) rapidly disappears if the columns cannot be stabilized.

As further evidence of the fact that the polymerlined columns of the present invention can be used for indefinite periods of time for routine analysis, a chromatogram of a mixture of ethyl esters that was separated on column 4 using temperature programming was observed. This chromatogram was obtained about 6 months after construction of the column and yet no loss of efficiency existed.

Thus, the useful life of a glass open tubular column can be prolonged by the use of a polymer film as a support for the stationary phase. Table V shows that the addition of a polymer film to the surface of the glass prior to coating it with stationary phase stabilizes the columns for several months. It can be seen, however, that when a solution of high concentration of polymer is used to form the film, the initial HETP is poor in comparison to columns coated with a solution of low polymer concentration (see Table V, Column 8). Although the column is stable, the addition of such a large amount of polymer causes the efficiency to be so poor as to make it impractical. To check this a section of Column 8 was observed. Simple observation using simple magnification showed that the film was a smooth layer with no evidence of droplet formation. Using polarized light, however, the photograph suggests that the polymer and stationary phase are no longer miscible. This is probably a result of the high amount of polymer present on this column.

The most ideal situation exists when the polymer concentrations is sufficiently low so as not to effect the Rohrschneider constants (see Table II, Columns 4–6) or cause any significant increase in initial HETP (see Table V, columns 3–13), but at the same time being adequate to stabilize the column. This is believed to be at a preferred loading of $6 \times 10^{-4}$ g/m or less (Table I, column 6). In columns where the stationary phase is coated directly onto the glass, heat and time cause the formation of droplets and the stationary phase loses its uniformity on the glass surface, thereby lowering the column efficiency. Normal operating conditions cause no decomposition of the polymer film nor do they degrade the mechanical adhesion of the polymer to the glass surface. The stationary phase is much more compatible with the organic polymer than with the glass and does not bead up on the polymer when the appropriate concentrations are used. The obvious consequence of this is the production of stable open tubular glass columns for gas chromatography.

From observation of a section of column 4 (made with 0.2% polymer) and column No. 1 (made with no polymer) after 6 months of operation, it was seen that the column without any polymer has formed large droplets of liquid phase, while the column coated with polymer still has a smooth film of liquid phase.

One advantage of this method of coating capillary columns is that relatively dilute solutions are preferred (2% or less) and clogging of the column during the coating operation does not occur. Some of the other methods used to attempt to stabilize capillary columns require passing suspended mixtures of solid material, for example Silanox 101, through the columns. This frequently clogs the column before the coating operation is completed.

A possible application of this behavior would be to stabilize metal columns in the same manner. Frequently, hot metal surfaces can act as catalysts and cause decomposition or adhesion of the solute to the inside surface of the metal columns. This is particularly true of many drugs. By coating the metal capillary column or packed column with polymer prior to coating it with the stationary phase, more stable columns should be produced. Likewise, other resin materials and other stationary phases could be used in the same manner disclosed herein to produce stable, polymer lined capillary columns of this invention.

While the method and article herein described constitute a preferred embodiment of the invention, it is to be understood that the invention is not limited to this precise method and article, and that changes may be made therein without departing from the scope of the invention which is defined in the appended claims.

What is claimed is:

1. A polymer-lined capillary column for use in gas chromatography having a thin layer of ethoxycarbonyl substituted polyphenylene resin, solvent-deposited and uniformly coated on the interior surface of the base column as a support for a stationary phase, said resin coated column further including a separate stationary phase with said resin.

2. The polymer-lined capillary column of claim 1 wherein said base column in glass.

3. The polymer-lined capillary column of claim 2 wherein said stationary phase is intermixed with said resin.

4. The polymer-lined capillary column of claim 2 wherein said stationary phase is a second layer overlying said resin layer.

* * * * *